United States Patent [19]

De Santis et al.

[11] 3,721,257

[45] March 20, 1973

[54] ELECTRO-FLUIDIC SIGNAL CONVERTER

[75] Inventors: Michael J. De Santis, Lyndhurst; Robert H. Page, Piscataway; Edward L. Rakowsky, Kinnelon, all of N.J.

[73] Assignee: The Singer Company, New York, N.Y.

[22] Filed: June 8, 1971

[21] Appl. No.: 151,031

[52] U.S. Cl. ....................137/828

[51] Int. Cl. ....................F15c 1/04

[58] Field of Search ....................137/81.5

[56] References Cited

UNITED STATES PATENTS

| | | | |
|---|---|---|---|
| 3,168,897 | 2/1965 | Adams et al. | 137/81.5 |
| 3,524,459 | 8/1970 | Brunberg et al. | 137/81.5 |
| 3,071,154 | 1/1963 | Cargitt et al. | 137/81.5 |
| 3,428,066 | 2/1969 | Herr | 137/81.5 |
| 3,438,384 | 4/1969 | Hurvitz | 137/81.5 |
| 3,508,564 | 4/1970 | Nelson | 137/81.5 |
| 3,635,236 | 1/1972 | Faley et al. | 137/81.5 |

*Primary Examiner*—Samuel Scott
*Attorney*—S. A. Giarratana and Thomas W. Kennedy

[57] ABSTRACT

An improved digital device is provided for converting alternating current or direct current electrical signals into corresponding fluidic signals either of the pressure or flow type. The device of the invention is basically a bi-stable fluid amplifier having a multiplicity of heating wires mounted in the power jet port thereof. These wires act to impede the gas flow through the port, and the physical impedance of the wires to the gas flow is a function of the heating electric current flowing through the wires. As will be described, the wires control the device to produce a desired fluidic output in response to an electric signal input which gives rise to heating electric currents in the aforesaid wires.

3 Claims, 3 Drawing Figures

INVENTORS:
Michael J. De Santis
Robert H. Page
Edward L. Rakowsky

By S. A. Giarratana
Thomas W. Kennedy
ATTORNEYS

INVENTORS:
Michael J. De Santis
Robert H. Page
Edward L. Rakowsky

By [signature]
Thomas W. Kennedy
ATTORNEYS

ELECTRO-FLUIDIC SIGNAL CONVERTER

BACKGROUND OF THE INVENTION

Many devices are known to the art for converting an electrical input signal into a fluidic output signal. Certain of such prior art devices involve, for example, electro-magnetic deflections of a solid surface in order to change the direction and/or flow rate of a gas or liquid stream passing through the device. Other prior art devices of the same general type use electrostatic deflection of an ionized fluid stream to achieve the desired result.

Still other prior art devices incorporate means for heating solid surfaces to change the point of wall attachment of a gas stream. Other prior art systems employ piezoelectric means by which either acoustic energy is employed to interact with a gas stream or the piezoelectric material itself acts as a flow valve. The fluidic output signal from the prior art devices enumerated above may be either proportional or digital. Most of the prior art devices employ a fluid amplifier for signal conversion, and the converter mechanism is usually located in the control port of the amplifier.

The prior art devices such as described briefly above all suffer from certain inherent disadvantages which are significant for most purposes. For example, the electromagnetic forces employed in the electro-magnetic deflection device are non-linear, and, in addition, hysteresis effects are encountered. The prior art electrostatic device requires a very high energy input, and there is a tendency for arcing to occur due to the large voltages involved, which are usually of the order of 1 kilo-volt or more.

The prior art device which incorporates the heating of solid surfaces is at a disadvantage in that it requires relatively large time intervals to heat its elements, and therefore exhibits very low frequency response performance. The devices using piezoelectric crystals, and the like, are either sensitive to accelerations, so that acceleration compensating means must be provided, or it can interact only with very low energy gas streams. When the prior art techniques, such as enumerated above, are used in an electric/fluidic converter, the resulting converter cannot be conveniently miniaturized, and in many cases must be relatively large.

In addition to the disadvantages inherent in the prior art, as enumerated above, environmental effects such as extremes in temperature, and radiation tend to degrade the performance of the prior art devices, and especially the electro-magnetic, electrostatic and wall heating type converters, such as referred to above.

DETAILED DESCRIPTION OF THE ILLUSTRATED EMBODIMENT

Figure 1:
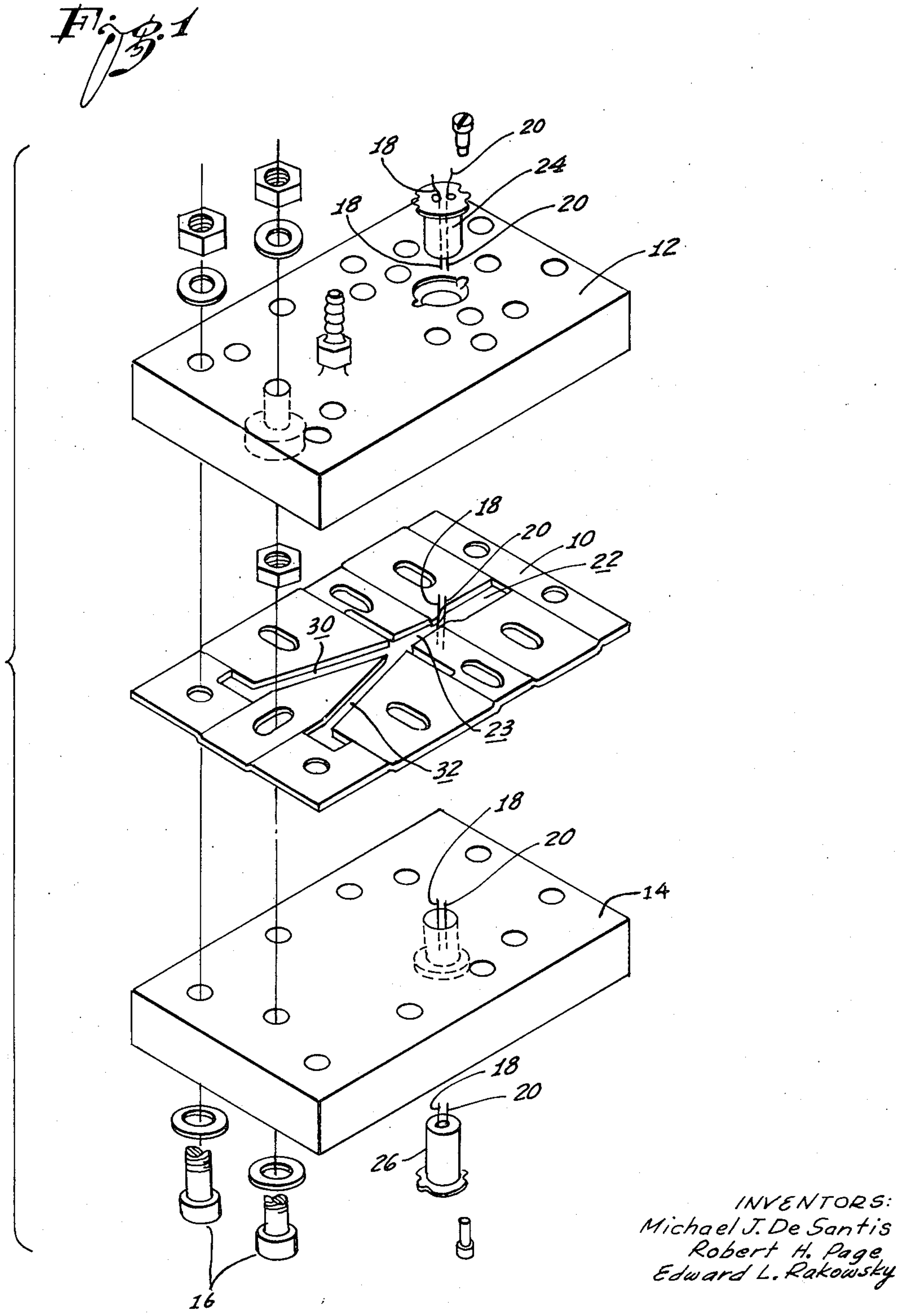
FIG. 1 is an exploded perspective representation of a device constituting one embodiment of the invention.

As shown in FIG. 1, the device is basically a bi-stable amplifier formed by the wafer 10, the wafer being sandwiched between two block-like plate members 12 and 14, the unit being held in an assembled condition by any appropriate fastening means, such as screws 16. The heating elements are wires 18 and 20, which are mounted in the power jet port 22 of the bi-stable fluid amplifier. The heating elements may be wires, as shown, or they may be plates, or other suitable shapes may be used. Insulators 24 and 26 are mounted in corresponding holes in the blocks 12 and 14 to hold the wires rigidly in place, and to prevent excessive heating of the other plates 12 and 14.

The amplifier wafer 10, as shown in FIG. 1, includes a first output leg 30 and a second output leg 32, in the form of angularly related channels in the wafer 10. The wires 18 and 20 act as barriers to the fluid flow from the power jet port 22 of the amplifier, and these wires deflect the fluid from one of the output legs 30, 32 to the other. The manner in which the wires 18 and 20 serve to deflect the fluid stream from the output leg 30 to the output leg 32 is shown, for example, in the schematic representations of FIGS. 2A and 2B.

Figure 2A:
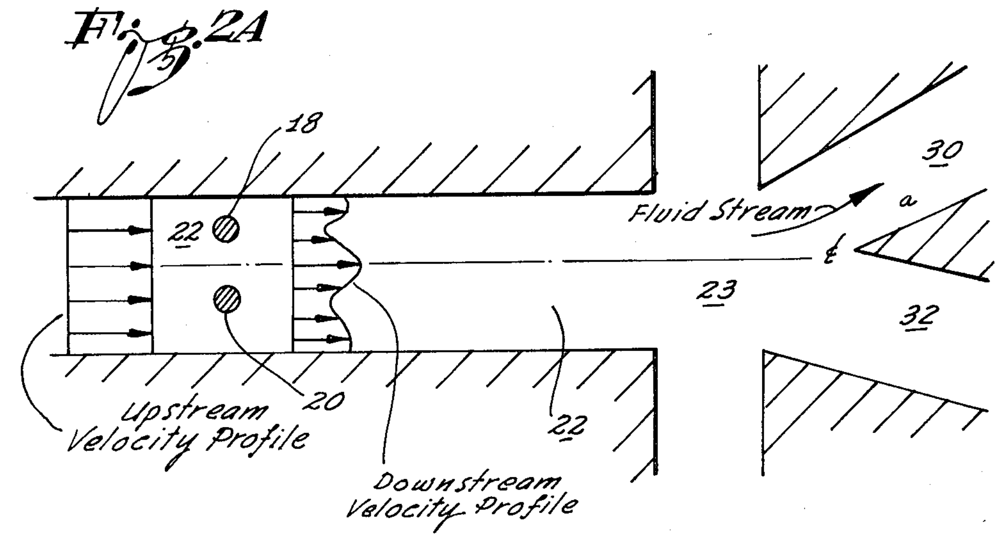
FIGS. 2A and 2B are schematic representations of a portion of the device of FIG. 1 on an increased scale, and represent the operation of the device in two possible modes.

The two wires 18 and 20 are placed symmetrically in a two-dimensional fluid stream. The up-stream velocity profile is uniform in both cases, as shown. In FIG. 2A, the wires act as barriers which impede the fluid flow, and the down-stream velocity profile is symmetrical with respect to the center line, as illustrated, the profile deficits being due to the wakes of the wires.

Figure 2B:
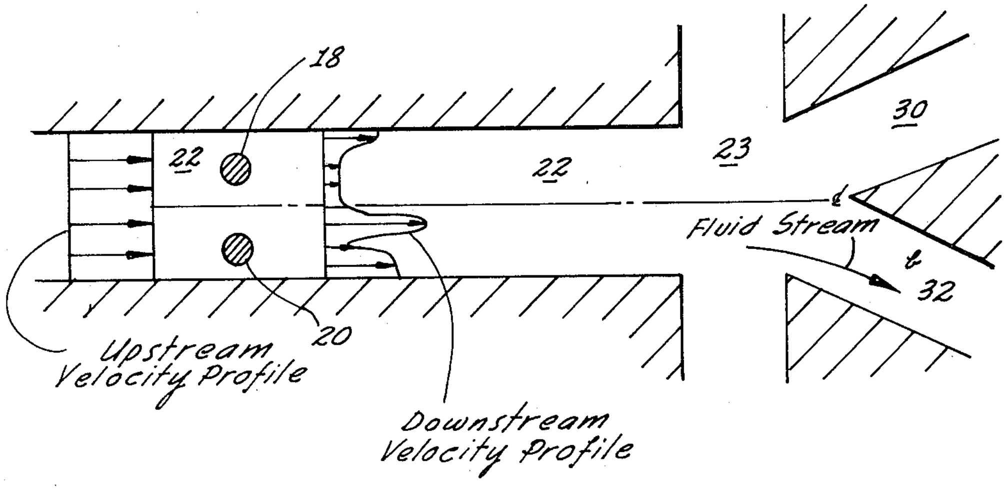

In FIG. 2A, neither wire 18 or 20 is heated. However, in FIG. 2B it is assumed that the wire 18 is heated, and therefore the resistance to flow around wire 18 is greater than that around wire 20. Therefore, the wake of the wire 18 will be larger than that of the wire 20, and the fluid stream velocity profile will be non-symmetrical, as shown in FIG. 2B. The large velocity deficit thereby created in the portion of the velocity profile in FIG. 2B adjacent the wire 18 will cause the jet stream to switch from the output leg 30 to the output leg 32. Alternately, if the wire 20 alone is heated, the fluid stream will then be switched from the output leg 32 to the output leg 30.

An advantage of the system shown in FIGS. 1 and 2 with respect to present electric/fluidic converters is that the system of the invention requires extremely low power to switch the fluid stream in the amplifier. Power of the order of 8 watts, for example, can be used. This is because the fluid stream is interrupted in the power nozzle portion of the amplifier, and not in the interaction region, as is the case with the prior art units.

The device also has the advantage in that is is immune to radiation, accelerations, and to extremes in temperature. This is because there are no electro-magnetic fields or electronic components involved in the control of the device, and which would be susceptible to radiation, accelerations, or extremes in temperature to exhibit degraded performance.

The device of the invention is also advantageous in that it may be easily miniaturized. The device is inherently simple, and involves only two basic components, namely a bi-stable fluid amplifier and the aforesaid heating elements. The response time of the converter of the invention is relatively fast as compared with the prior art devices involving heating, this is because there is no requirement for energy to be transferred to the fluid itself. The device is also advantageous in that it does not involve any heating parts.

As mentioned above, the heating elements 18 and 20 may be wires, or they may assume other appropriate configurations such as flat plates, or contoured/streamlined bodies. The power nozzle itself in which the wires are located may be converging, diverging, or it may have straight walls.

The invention provides, therefore, an improved electric-fluidic converter which requires very low power input since the mechanism for controlling the device is located in the power nozzle of the unit. This is in contradistinction to the present day electric/fluidic converters which employ bi-stable amplifiers in which switching is effectuated by mechanisms located in the control portion of the amplifier. As noted above, the improved device of the invention requires no moving parts, and is immune to acceleration so that it does not require any acceleration compensation.

The fluid enters the unit through the power jet or nozzle 22 and flows past the wires 18 and 20 into the interaction region of the unit which is designated 23. Since the amplifier is bistable, the fluid will initially flow out through one output channel or leg 30, as shown in FIG. 2A. The heating wires 18 and 20 are mounted, as shown, in the jet portion 22 of the amplifier at a predetermined distance up-stream of the power nozzle exit. Typical wire diameters are, for example, 0.010–0.020 inches. A DC or AC electric current is passed through one of the wires, as described above, in order to switch the flow stream of the fluid completely from one output leg 30, 32 to the other.

In the operation of a constructed embodiment of the invention, tests were conducted to determine under what conditions deflection of the fluid stream from one output leg 30, 32 to the other could be effected, and also to determine the time lag between the application of electric current to a particular wire and the corresponding deflection of the fluid stream. It was found, for example, that a power jet at a pressure of 1–6 p.s.i. could be deflected from one output leg to the other, by two wires mounted up-stream of the nozzle exit. When the input voltage was of the order of 3 volts, and the pressure signal was approximately 0.09 p.s.i., the time required for the output pressure to reach 60 percent of its initial value upon switching was about 0.5 seconds.

It will be appreciated that while a particular embodiment of the invention has been shown and described, modifications may be made. It is intended to cover all such modifications which fall within the spirit and scope of the invention in the following claims.

What is claimed is:

1. An electric-fluidic converter comprising:

a bi-stable fluid amplifier having interconnected fluid passages including a common power jet passage and a pair of output passages interconnected thereto at an interaction region within the amplifier, so that a fluid stream flowing through the power jet passage passes through the interaction region to one of said output passages or the other; and electrically conductive element means extending through said power jet passage to produce at least one wake in the fluid stream so as to cause the stream to be deflected to one of said output passages or the other dependent upon the geometry of the element means, the aforesaid geometry being a function of an electric current passed through said electrically conductive element means.

2. The combination defined in claim 1, in which said electrically conductive element means comprises a pair of electrically conductive elements extending through the fluid stream transversely across said power jet passage and symmetrically disposed with respect to one another and to the walls of said jet passage.

3. The combination defined in claim 1, in which said elements in the form of wires, the diameters of which are proportional to an electric heating current passing therethrough.

* * * * *